Sept. 4, 1951  J. M. TILTON, JR  2,566,384
SELF-SEALING ARTICLE
Filed May 16, 1947

Inventor
Joseph M. Tilton Jr.
By Robert W. Furlong
Atty

Patented Sept. 4, 1951

2,566,384

UNITED STATES PATENT OFFICE 2,566,384

SELF-SEALING ARTICLE

Joseph M. Tilton, Jr., Akron, Ohio, assignor to The B. F. Goodrich Company, New York, N. Y., a corporation of New York Application May 16, 1947, Serial No. 748,553

9 Claims. (Cl. 152—347)

This invention relates to a self-sealing article and is particularly concerned with a self-sealing article such as a tire tube, tubeless tire or the like having a single self-sealing layer.

The objects of this invention include providing an article which is self-sealing upon being punctured and particularly providing a pneumatic article having a single self-sealing layer. Further objects include providing a construction in which the self-sealing layer possesses inherent resistance to plastic flow sufficient to allow use of a single unconfined sealing layer in articles such as tire tubes which are subject to large centrifugal forces in use, and providing a simplified construction in which but a single sealing composition is employed in a relatively thin layer adapted to provide adequate sealing properties without unduly increasing the weight or cost of the article. Other objects will be apparent from the description which follows.

I have discovered that an article may be constructed in accordance with the foregoing objects by use of a sealing composition comprising a partially vulcanized rubbery copolymer of a major proportion of an isoolefin having from 4 to 7 carbon atoms with a minor proportion of an open-chain conjugated diolefin having from 4 to 8 carbon atoms.

The invention may be embodied in any article where self-sealing properties are necessary or desirable and is particularly applicable for use in constructing pneumatic articles subject to centrifugal forces tending to cause plastic flow of the self-sealing components. The invention will be described in detail with reference to a few preferred embodiments as illustrated in the accompanying drawings.

Figure 1:
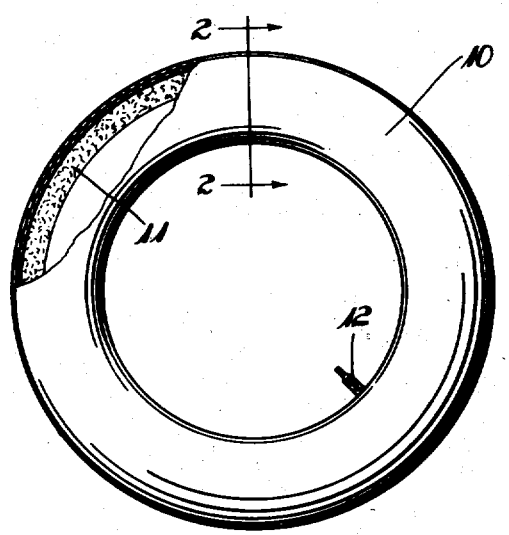
Fig. 1 is a view in elevation of a tire tube having a single self-sealing layer in accordance with this invention, a portion thereof being broken away and in section for clarity of illustration.
Figure 2:
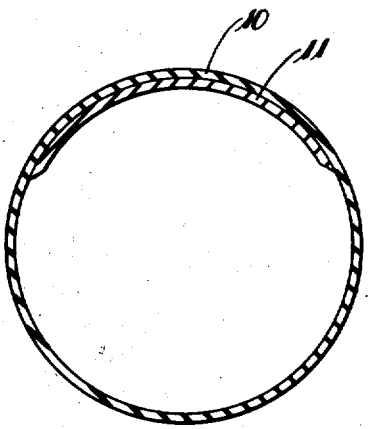
Fig. 2 is a section on line 2—2 of Fig. 1.

A tire tube embodying this invention as shown in Fig. 1 comprises a tube wall 10 of a vulcanized rubber with a single self-sealing layer 11 positioned inside the tread portion of the tube and adhered to tube wall 10 around the entire circumference of the tread portion. The tube is provided with a valve stem 12 as is conventional.

Tube wall 10 comprises any vulcanized rubber composition such as is commonly used in making tire tubes. Thus the vulcanized rubber may comprise natural rubber; a synthetic rubber as for example a rubbery copolymer of butadiene with styrene, acrylonitrile or with similar copolymerizable monomers; a rubbery polymer of isoprene or chloroprene, or a copolymer of isoprene with chloroprene or with isobutylene; reclaimed rubbers; or mixtures of these or similar rubbery materials. The composition may of course contain any of the commonly used compounding materials for rubber composition including vulcanizing agents and accelerators therefor, fillers, reinforcing materials, softeners, etc.

The self-sealing layer 11 comprises a partially vulcanized rubbery composition in which the rubber consists of a rubbery copolymer of a major proportion, i. e., over 50% by weight, of an isoolefin having from 4 to 7 carbon atoms with a minor proportion by weight of an open-chain conjugated diolefin having from 4 to 8 carbon atoms, and desirably a rubbery copolymer of a major proportion of isobutylene with a minor proportion of isoprene. Preferably, the copolymer consists of from 70 or 80 to 99½ parts by weight of an isomonoolefin such as isobutylene or ethyl methyl ethylene copolymerized with from ½ to 20 or 30 parts by weight of an open-chain conjugated diolefin such as isoprene; butadiene - 1,3; piperylene; 2,3 - dimethyl buta - diene-1,3; 1,2-dimethyl butadiene-1,3 (or 3-methyl pentadiene-1,3); 1,3-dimethy butadiene-1,3; 1-ethyl butadiene-1,3 (or hexadiene-1,3); 1,4-dimethyl butadiene-1,3 (or hexadiene-2,4); the copolymerization being effected by the usual method of copolymerizing such monomers as disclosed in detail in U. S. Patents 2,356,128, 2,356,129, and 2,356,130 to Thomas and Sparks. Typical examples of these synthetic rubbers are known to the trade as "GR–I," "Butyl A," "Butyl B," "Butyl C" and "Flexon." For purposes of brevity the copolymer will be referred to as "Butyl" rubber.

The above-named copolymer is partially vulcanized to a condition in which a copolymer exhibits inherent resistance to plastic flow, in which partially vulcanized condition the copolymer retains its self-sealing ability unlike other rubbers which are self-sealing only in the unvulcanized condition if at all. I have discovered that if a "Butyl" rubber composition is prepared containing 0.3 to 0.6% by weight of sulfur available for vulcanization based on the weight of "Butyl" rubber and this composition is subjected to the ordinary vulcanizing cycle, the resulting partially vulcanized composition will be eminently suitable for practicing this invention. The controlled amount of sulfur which has been added partially vulcanizes the "Butyl" rubber so that it possesses inherent strength to resist plastic flow to a sufficient degree to allow a single sealing layer to be used and particularly to allow it to be used as an unconfined inner layer rather than a layer which must be contained between two stiffer layers.

The sulfur available for vulcanization may be supplied by incorporating elemental sulfur in the sealing composition or by incorporating a material which will act as a sulfur donor. For example, available sulfur may be supplied by a dithiocarbamyl compound such as a thiuram disulfide as typified by tetramethyl thiuram disulfide, tetraethyl thiuram disulfide, dipentamethylene thiuram tetrasulfide and other compounds of the formula

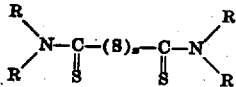

wherein each R is an organic radical preferably an alkyl group of less than 10 carbon atoms and $x$ is an integer from 2 to 4. Such sulfur donors are used in amounts such that the available sulfur present during vulcanization is equivalent to elemental sulfur in an amount of 0.3 to 0.6% by weight based on the weight of "Butyl" rubber.

"Butyl" rubber vulcanized with less than 0.3% available sulfur possesses excellent self-sealing properties but is subject to excessive plastic flow and is not practical to use as a sealing layer where it is subject to deformation forces such as are found in service in a tire tube. A "Butyl" rubber composition using lesser amounts of sulfur as for example 0.2% sulfur would find some application when the sealing layer is completely confined within a wall structure where the degree of adhesion of the sealing layer to the rest of the wall is not important.

"Butyl" rubber vulcanized with more than 0.6% sulfur has inherent strength but loses much of its self-sealing quality. The composition possessing optimum properties as a sealing layer for use in combination with a wall layer possessing the requisite strength is a composition in which the "Butyl" rubber is vulcanized with 0.3 to 0.6% available sulfur based on the weight of the "Butyl" rubber. If desired, of course, the sealing layer of this invention may be confined between two other layers, but the second layer is unnecessary.

The sealing composition in addition to the sulfur or sulfur-bearing material and "Butyl" rubber may also contain the usual vulcanization accelerators, fillers, reinforcing materials, softeners, etc. conventionally used in compounding "Butyl" rubber. Since "Butyl" rubber shows no particular affinity for sulfur it is not necessary to include a material which will retard migration of sulfur into the sealing layer.

The self-sealing layer 11 may overlie the entire inner surface of tube wall 10 but preferably is used only in the tread or crown portion of the tube in which region the tube is most likely to be punctured. The sealing layer is preferably from 0.1" to 0.3" thick although a layer up to 0.5" in thickness or thicker may be used. A layer less than 0.1" thickness does not seal sufficiently for practical purposes, while a layer over 0.3" thick adds undesirable weight to the tube as well as causing greater heat build-up during service than is desirable.

A tire tube embodying this invention may be built by any of the well-known methods of building multiple ply tubes. The sealing layer is preferably adhered to the tube wall by means of a suitable cement, preferably a vulcanizable cement comprising "Butyl" rubber dissolved in a suitable solvent, particularly to insure proper positioning of the component parts until vulcanization has been effected. The adhesion between the tube wall and the sealing layer must be sufficient to prevent separatoin of the layers during service and for this reason it is sometimes desirable to use a binder layer to bond the sealing layer to the wall. A suitable cement may be used as the binder, but preferably a partially vulcanized "Butyl" rubber composition is interposed in a thin layer between the sealing layer and the wall, then vulcanization of this thin layer together with the wall of the tube is completed to give a unitary structure.

Figure 3:
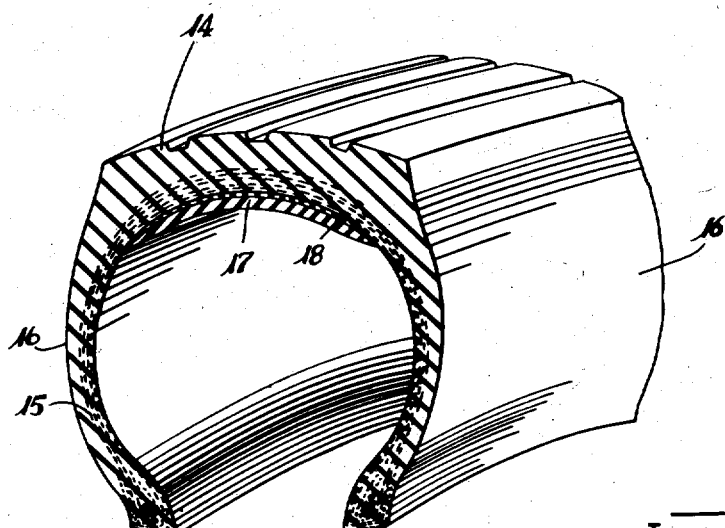
Fig. 3 is a fragmentary sectional perspective view of a tubeless tire embodying this invention.

The invention is particularly applicable for use in a tire tube construction but may be embodied in any article which comprises a wall structure normally subject to permanent puncture. Such an embodiment of the invention is illustrated in Fig. 3 wherein a so-called tubeless tire comprising the usual tread 14, carcass 15, and sidewall portions 16, 16 has a sealing layer 17 positioned inside the carcass of the tire adjacent the tread portion. In the case of a tubeless tire it is desirable to employ a binder layer 18 to insure adhesion between the tread and the sealing layer. The binder layer preferably comprises a "Butyl" rubber composition as described hereinabove for use with a tire tube, and the carcass portion and tread portion of the tire may be of conventional construction utilizing natural or synthetic rubber.

As in the case of a tire tube, the use of a partially vulcanized butyl sealing layer allows a simple construction to be used, involving but a single sealing layer which is positioned on the inner surface of the tire rather than being disposed between two wall layers.

An article embodying this invention is readily assembled from a minimum number of component parts and the finished article is lightweight and does not suffer from excessive heat build-up in service. The sealing layer has sufficient inherent strength that it undergoes no appreciable plastic flow under the influence of deformation stresses. When the wall of the article is punctured, the opening is quickly closed by the sealing layer which also seals about the puncturing object. The sealing layer has little tendency to lose its sealing property since it is inherently resistant to further vulcanization.

A typical composition used as a sealing layer will be described for purposes of illustration but it will be understood that the ratio of "Butyl" rubber and sulfur may be varied within the preferred values hereinabove set forth and that the other compounding materials may be replaced by and/or supplemented with such other materials as are commonly used in compounding "Butyl" rubber compositions and the amounts thereof may be varied in accordance with conventional compounding methods.

*Example*

| Material | Parts by Weight |
|---|---|
| "Butyl" rubber (80:20 copolymer of isobutylene and isoprene) | 100.0 |
| Iron oxide | 50.0 |
| Softeners (Hydrogenated rosin and a saturated aliphatic liquid hydrocarbon) | 25.0 |
| Sulfur | 0.4 |
| 2-mercapto benzothiazole | 0.4 |
| Total | 175.8 |

The iron oxide serves as a reinforcing material and the softeners serve to impart tackiness to the composition and to plasticize it. The composition is prepared in the usual manner by mixing the components thereof on a mill or in an internal mixer. The self-sealing layer may be formed by calendering or extruding the composition or in any other manner as desired. After the composition has been subjected to a vulcanizing cycle of 307° F. for 8 minutes, the partially vulcanized product possesses excellent sealing properties and does not undergo plastic flow in the unconfined state even under the influence of considerable deformation stress. Vulcanization may, of course, be effected at any of the ordinary vulcanization temperatures of 250°-340° F. or higher for periods of 4 to 45 minutes.

The invention has been described in considerable detail with reference to a few preferred embodiments but it will be understood that variations and modifications may be effected within the spirit and scope of the invention as defined in the appended claims.

I claim:

1. A laminated article comprising a layer of material susceptible to permanent puncture and adhered to said layer in face-to-face relation a layer of a self-sealing composition comprising a rubbery copolymer of a major proportion of an isoolefin having from 4 to 7 carbon atoms with a minor proportion of an open-chain conjugated diolefin having from 4 to 8 carbon atoms, said rubbery copolymer being partially vulcanized by heating with from 0.3% to 0.6% by weight of sulfur available for vulcanization based on the weight of said copolymer for 4 to 45 minutes at 250° to 340° F.

2. A self-sealing article such as a tire tube and the like comprising a layer of a self-sealing composition bonded to a wall structure comprising a vulcanized rubber, said self-sealing composition comprising a rubbery copolymer of a major proportion of an isoolefin having from 4 to 7 carbon atoms with a minor proportion of an open-chain conjugated diolefin having from 4 to 8 carbon atoms, said rubbery copolymer being partially vulcanized by heating with from 0.3% to 0.6% of sulfur available for vulcanization based on the weight of said copolymer for 4 to 45 minutes at 250° to 340° F.

3. A self-sealing article such as a tire tube and the like comprising a single layer of a self-sealing composition bonded to a wall structure comprising a vulcanized rubber composition, said self-sealing composition comprising a rubbery copolymer of a major proportion of isobutylene with a minor proportion of isoprene, said rubbery copolymer being partially vulcanized by heating with from 0.3% to 0.6% of sulfur available for vulcanization based on the weight of said copolymer for 4 to 45 minutes at 250° to 340° F.

4. A self-sealing article such as a tire tube and the like comprising a single layer of a self-sealing composition bonded to a wall structure comprising a vulcanized rubber composition, said self-sealing composition comprising a rubbery copolymer of from 80 to 99½ parts of isobutylene with from ½ to 20 parts of isoprene, said rubbery copolymer being partially vulcanized by heating with from 0.3% to 0.6% of sulfur available for vulcanization based on the weight of said copolymer for 4 to 45 minutes at 250° to 340° F.

5. A self-sealing article such as a tire tube and the like comprising a single layer of a self-sealing composition having inherent resistance to plastic flow bonded to a wall structure comprising a vulcanized rubber composition, said self-sealing composition comprising a rubbery copolymer of a major proportion of an isoolefin having from 4 to 7 carbon atoms with a minor proportion of an open-chain conjugated diolefin having from 4 to 8 carbon atoms, said self-sealing composition being partially vulcanized to a condition inherently resistant to plastic flow by heating for 4 to 45 minutes at 250° to 340° F. with from 0.3% to 0.6% of sulfur available for vulcanization based on the weight of said copolymer.

6. A self-sealing article such as a tire tube and the like comprising a layer of a partially vulcanized self-sealing composition adhered to a wall of a vulcanized rubber composition, said self-sealing composition comprising a rubbery copolymer of a major proportion of an isoolefin having from 4 to 7 carbon atoms with a minor proportion of an open-chain conjugated diolefin having from 4 to 8 carbon atoms, said rubbery copolymer being partially vulcanized by heating with from 0.3% to 0.6% by weight of sulfur available for vulcanization based on the weight of said copolymer for 4 to 45 minutes at 250° to 340° F.

7. A self-sealing article such as a tire tube and the like comprising a wall structure including a layer of a vulcanized rubber and adhered thereto a layer 0.1" to 0.3" thick of a self-sealing composition comprising a rubbery copolymer of a major proportion of an isoolefin having 4 to 7 carbon atoms with a minor proportion of an open-chain conjugated diolefin having from 4 to 8 carbon atoms, said rubbery copolymer being partially vulcanized by heating with from 0.3% to 0.6% of sulfur available for vulcanization based on the weight of said copolymer for 4 to 45 minutes at 250° to 340° F.

8. A tire tube comprising an outer layer of a vulcanized rubber composition and an inner self-sealing layer extending circumerentially around the crown of said outer layer and adhered to said outer layer, said inner layer being from 0.1 to 0.3" thick and comprising a rubbery copolymer of a major proportion of isobutylene with a minor proportion of isoprene partially vulcanized to an extent equivalent to the vulcanization obtained by heating for 4 to 15 minutes at 250° to 340° F. with from 0.3% to 0.6% by weight of sulfur based on the weight of said copolymer.

9. A self-sealing tire casing of the tubeless variety comprising an outer layer comprising vulcanized rubber, an intermediate layer comprising a vulcanized rubbery copolymer of a major proportion of isobutylene with a minor proportion of isoprene, and an inner self-sealing layer of 0.1 to 0.3" thickness comprising a rubbery copolymer of a major proportion of isobutylene with a minor proportion of isoprene partially vulcanized by heating for 4 to 45 minutes at 250° to 340° F. with from 0.3% to 0.6% by weight of sulfur available for vulcanization based on the weight of said copolymer, said layers being adhered together in a unitary structure.

JOSEPH M. TILTON, Jr.

REFERENCES CITED

The following references are of record in the file of this patent:

UNITED STATES PATENTS

| Number | Name | Date |
|---|---|---|
| 1,237,698 | Reuter | Aug. 21, 1917 |
| 2,055,797 | Loomis | Sept. 29, 1936 |
| 2,241,593 | Gramelspacher | May 13, 1941 |
| 2,392,590 | Hulswit et al. | Jan. 8, 1946 |

Certificate of Correction

Patent No. 2,566,384 September 4, 1951

JOSEPH M. TILTON, Jr.

It is hereby certified that error appears in the printed specification of the above numbered patent requiring correction as follows:

Column 2, line 38, for "a", second occurrence, read *the*; column 6, line 38, for "circumerentially" read *circumferentially*; line 45, for "15 minutes" read *45 minutes*; same column, "References Cited" under "UNITED STATES PATENTS" insert the following:

| | | |
|---|---|---|
| 2,419,016 | Gray et al | April 15, 1947 |
| 2,438,965 | Dasher | April 6, 1948 |

FOREIGN PATENTS

| | | |
|---|---|---|
| 112,875 | Australia | April 7, 1941 |

OTHER REFERENCES

Rubber Age, Vol. 51 No. 5, pg. 377, 378, 380 August 1942 and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*